US008285812B2

(12) United States Patent
Williams et al.

(10) Patent No.: US 8,285,812 B2
(45) Date of Patent: Oct. 9, 2012

(54) PEER-TO-PEER SYNCHRONOUS CONTENT SELECTION

(75) Inventors: K. Aaron Williams, Woodinville, WA (US); John Selbie, Kirkland, WA (US); Drew Canitz, Bothell, WA (US); Kandarp Jani, Seattle, WA (US); Steven Abrahams, Seattle, WA (US); Troy Schauls, Seattle, WA (US); Asta Roseway, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 12/147,526

(22) Filed: Jun. 27, 2008

(65) Prior Publication Data
US 2009/0327448 A1  Dec. 31, 2009

(51) Int. Cl.
*G06F 15/16* (2006.01)
(52) U.S. Cl. ........ 709/217; 709/203; 709/204; 709/207; 709/227; 709/229; 709/206; 709/240; 726/14
(58) Field of Classification Search .................... 709/217
See application file for complete search history.

(56) References Cited

U.S. PATENT DOCUMENTS

| | | | | |
|---|---|---|---|---|
| 5,719,761 | A * | 2/1998 | Gatti et al. ........................ 700/1 |
| 6,058,399 | A * | 5/2000 | Morag et al. .................. 709/203 |
| 7,200,590 | B2 * | 4/2007 | Everett-Church et al. .... 709/203 |
| 7,761,507 | B2 * | 7/2010 | Herf et al. ...................... 709/204 |
| 2003/0212804 | A1 * | 11/2003 | Hashemi ....................... 709/228 |
| 2005/0021624 | A1 * | 1/2005 | Herf et al. ...................... 709/204 |
| 2005/0172001 | A1 | 8/2005 | Zaner et al. |
| 2005/0219223 | A1 * | 10/2005 | Kotzin et al. .................. 345/173 |
| 2005/0286546 | A1 | 12/2005 | Bassoli et al. |
| 2005/0287852 | A1 * | 12/2005 | Sugawara et al. .............. 439/135 |
| 2007/0174471 | A1 * | 7/2007 | Van Rossum .................. 709/229 |
| 2007/0180135 | A1 | 8/2007 | Kenrick et al. |
| 2007/0201502 | A1 * | 8/2007 | Abramson ..................... 370/429 |
| 2007/0208751 | A1 | 9/2007 | Cowan et al. |
| 2007/0226365 | A1 | 9/2007 | Hildreth et al. |
| 2008/0046932 | A1 * | 2/2008 | Stallings et al. ................ 725/52 |
| 2008/0065782 | A1 * | 3/2008 | Jones ........................... 709/240 |
| 2008/0134043 | A1 * | 6/2008 | Georgis et al. ................ 715/733 |
| 2008/0256621 | A1 * | 10/2008 | Casimere et al. .............. 726/14 |
| 2008/0284696 | A1 * | 11/2008 | Rosenblatt ...................... 345/87 |

FOREIGN PATENT DOCUMENTS
WO  2007117251 A1  10/2007

OTHER PUBLICATIONS

Phung, et al "Autonomic Control for Quality Collaborative Video Viewing", 2004, 5 Pages.
Vogel, et al "Consistency Control for Distributed Interactive Media", 2001, 10 Pages.
Vogel, et al, "Consistency Control for Synchronous and Asynchronous Collaboration based on Shared Objects and Activities", 2004, 31 Pages.
Benslimane, et al, "Dynamical Grouping Model for Distributed Real Time Causal Ordering", 20 Pages, 2002.

* cited by examiner

*Primary Examiner* — Brian P Whipple
*Assistant Examiner* — Natisha Cox

(57) ABSTRACT

Various technologies for sharing digital images within an instant messaging (IM) session between two users. In one implementation, a first user uploads a set of images to the second user. The set of images may be displayed as thumbnails on the displays of both users. By clicking on one of the thumbnails, either user may make the associated image appear as a larger image on both users' displays. In the event that both users click on different images simultaneously, or near-simultaneously, a protocol may be employed that selects which image is displayed.

19 Claims, 5 Drawing Sheets

PEER-TO-PEER SYNCHRONOUS CONTENT SELECTION

BACKGROUND

Instant messaging (IM) is a technology that facilitates real-time text-based communication between two or more participants over computer networks, e.g., the Internet. Although IM typically happens in real-time, some systems allow the sending of messages to people not currently logged on (offline messages), thus removing much of the difference between IM and e-mail.

Many IM services have additional features, such as immediate receipt of acknowledgment, group chatting, conference services (including voice and video), and file transfer. In certain cases, it is possible to save an IM conversation for later reference. In such cases, instant messages are typically logged in a local message history. Logging instant messages may facilitate the ready exchange of unwieldy information like web addresses or document snippets.

SUMMARY

Described herein are implementations of various technologies for sharing digital images within an instant messaging (IM) session between two users. In one implementation, a first user uploads a set of images to the second user. The set of images may be displayed as thumbnails on the displays of both users. By clicking on one of the thumbnails, either user may make the associated image appear as a larger image on both users' displays. In the event that both users click on different images simultaneously, or near-simultaneously, a protocol may be employed that selects which image is displayed.

In another implementation, while the images are uploading to the second user's computer, the second user may modify a sequence within which the images upload. After the first user initiates the upload, the thumbnails may appear on both users' displays in the sequence that the images will upload. The second user may click on a thumbnail that is not yet uploaded to move the associated image to the top of an upload queue. In response, the sequence of the displayed thumbnails may change on both users' displays to reflect the new upload sequence.

In one implementation, as each image is uploaded, a portion of the associated thumbnail appears as grayed-out to indicate a proportion of the image that is uploaded, in the fashion of a progress bar.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As to terminology, any of the functions described with reference to the figures can be implemented using software, firmware, hardware (e.g., fixed logic circuitry), manual processing, or a combination of these implementations. The term "logic," "module," "component," or "functionality" as used herein generally represents software, firmware hardware, or a combination of these implementations. For instance, in the case of a software implementation, the term "logic," "module," "component," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules, components and functionality into distinct units may reflect an actual physical grouping and allocation of such software, firmware, and/or hardware, or may correspond to a conceptual allocation of different tasks performed by a single software program, firmware program, and/or hardware unit. The illustrated logic, modules, components, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

The techniques described herein are also described in various flowcharts. To facilitate discussion, certain operations are described in these flowcharts as constituting distinct steps performed in a certain order. Such implementations are exemplary and non-limiting. Certain operations can be grouped together and performed in a single operation, and certain operations can be performed in an order that differs from the order employed in the examples set forth in this disclosure.

Figure 1:
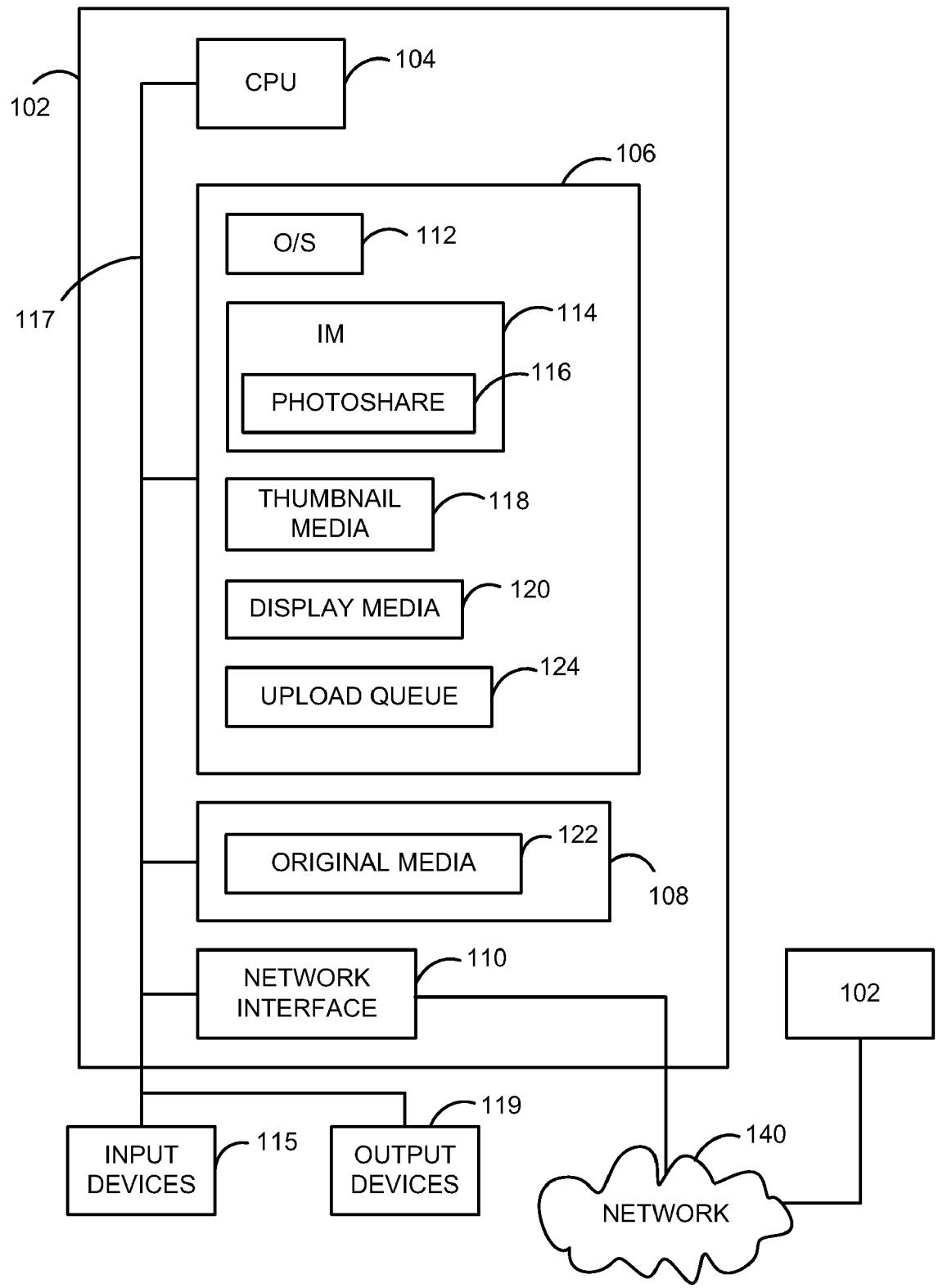
FIG. 1 illustrates a schematic diagram of a computing system in which the various technologies described herein may be incorporated and practiced.

FIG. 1 illustrates a schematic diagram of a computing system 100 in which the various technologies described herein may be incorporated and practiced. Although the computing system 100 may include conventional desktop or server computers, other computer system configurations may be used.

The computing system 100 may include two client computers 102 that may be peer-connected over a network 140. Each of the client computers 102 may include a central processing unit (CPU) 104, a system memory 106, a storage 108, a network interface 110, and a system bus 117 that couples various system components to the CPU 104. Although only one CPU 104 is illustrated in the client computer 102, it should be understood that in some implementations the client computer 102 may include more than one CPU 104.

The system bus 117 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Additionally, the user may enter commands and information into the client computer 102 through input devices 115. The input devices 115 may include devices such as a keyboard and pointing device. Other input devices may include a microphone, joystick, game pad, satellite dish, scanner, or the like. These and other input devices 115 may be connected to the CPU 104 through a serial port interface coupled to the system bus 117, but may be connected by other interfaces, such as a parallel port, game port or a universal serial bus (USB).

One or more output devices 119 may also be connected to the system bus 117 via an interface, such as a video adapter. The output devices 119 may include a display monitor, or other peripheral output devices, such as speakers and printers.

The system memory 106 may include a read only memory (ROM), a random access memory (RAM), and a basic input/output system (BIOS) (none of which are shown). The BIOS may contain the basic routines that help transfer information between elements within the client computer 102, such as during start-up.

The storage 108 may include a hard disk drive for reading from and writing to a hard disk, a magnetic disk drive for reading from and writing to a removable magnetic disk, and an optical disk drive for reading from and writing to a removable optical disk, such as a CD ROM or other optical media. The hard disk drive, the magnetic disk drive, and the optical disk drive may be connected to the system bus 117 by a hard disk drive interface, a magnetic disk drive interface, and an optical drive interface, respectively. The drives and their associated computer-readable media may provide nonvolatile storage of computer-readable instructions, data structures, program modules and other data for the client computer 102. Neither the drives nor their respective interfaces are shown in FIG. 1.

Although the client computer 102 is described herein as having a hard disk, a removable magnetic disk, and/or a removable optical disk, it should be appreciated by those skilled in the art that the client computer 102 may also include other types of computer-readable media that may be accessed by a computer. For example, such computer-readable media may include computer storage media and communication media.

Computer storage media may include volatile and nonvolatile, and removable and non-removable media implemented in any method or technology for storage of information, such as computer-readable instructions, data structures, program modules or other data.

Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the client computer 102.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal.

By way of example, and not limitation, communication media may include wired media such as a wired network or direct-wired connection, and wireless media such as acoustic, RF, infrared and other wireless media. Combinations of any of the above may also be included within the scope of computer readable media.

Further, the client computer 102 may operate in a networked environment using logical connections to one or more remote computers, such as another client computer 102. The logical connections may include the network interface 110, connected to the network 140. The network 140 may be any network or collection of networks, such as enterprise-wide computer networks, intranets, local area networks (LAN), and wide area networks (WAN). In one implementation, the network 140 may be the Internet.

A number of program or data modules may be stored in the system memory 106 and the storage 108. More specifically, the storage 108 may contain original media 122. The original media 122 may contain images or other media that a user may share with another user during an instant messaging (IM) session. The original media 122 may be stored in a format suitable for capturing quality image data. In one implementation, the original media 122 may be stored as 1024×768 pixel images.

The system memory 106 may contain an operating system 112, an IM application 114, thumbnail media 118, display media 120, and an upload queue 124. The operating system 112 may be any suitable operating system that may control the operation of a networked personal or server computer, such as Windows® Vista, Mac OS® X, Unix-variants (e.g., Linux® and BSD®), and the like.

The IM application 114 may be any software that conducts an IM session between two or more client computers 102, such as Windows® Live Messenger. Typically, a host user initiates an IM session with one or more guest users.

The IM application 114 may include a photoshare application 116. The photoshare application 116 may enable both the host and the guest to share the original media 122 on the host's and guest's respective client computers 102 with the other user during the IM session. The photoshare application 116 is described in greater detail with reference to FIGS. 2-5.

The thumbnail media 118 may include reduced size versions of the original media 122 that the host/guest may share with the other user. The thumbnail media 118 may be stored in a format that is suitable for rapid transfer over the network 140. In one implementation, the thumbnail media 118 may be stored as 50×15 pixel images. The thumbnail media 118 may be displayed on the output device 119 of both client computers 102 during the IM session. The thumbnail media 118 are described in greater detail with reference to FIGS. 2-4.

Figure 4:
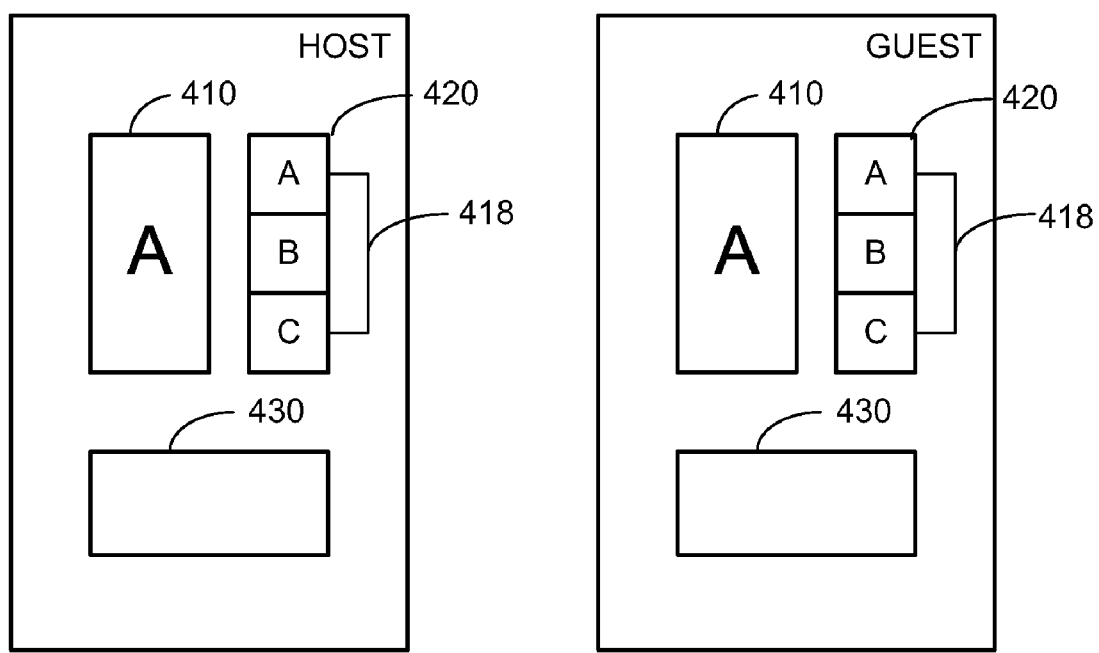
FIG. 4 illustrates an example user interface in side-by-side screen shots for the host and guest according to implementations described herein.

Like the thumbnail media 118, the display media 120 may also include versions of the original media 122 in a reduced size format. However, the display media 120 may be stored in a format that facilitates transfer over the network 140 and viewing on the output device 119. An example of the display media 120 is illustrated in FIG. 4.

When sharing images from the original media 122, the host or guest may upload associated display media 120 to the other user's client computer 102. For clarity, the client computer 102 of the user that shares the media is referred to as the source. Similarly, the client computer 102 of the user with whom the media is shared is referred to as the destination.

The upload queue 124 may include the display media 120 that the photoshare application 116 has not yet completed uploading. The upload queue 124 is described in greater detail with reference to FIG. 2.

Figure 2:
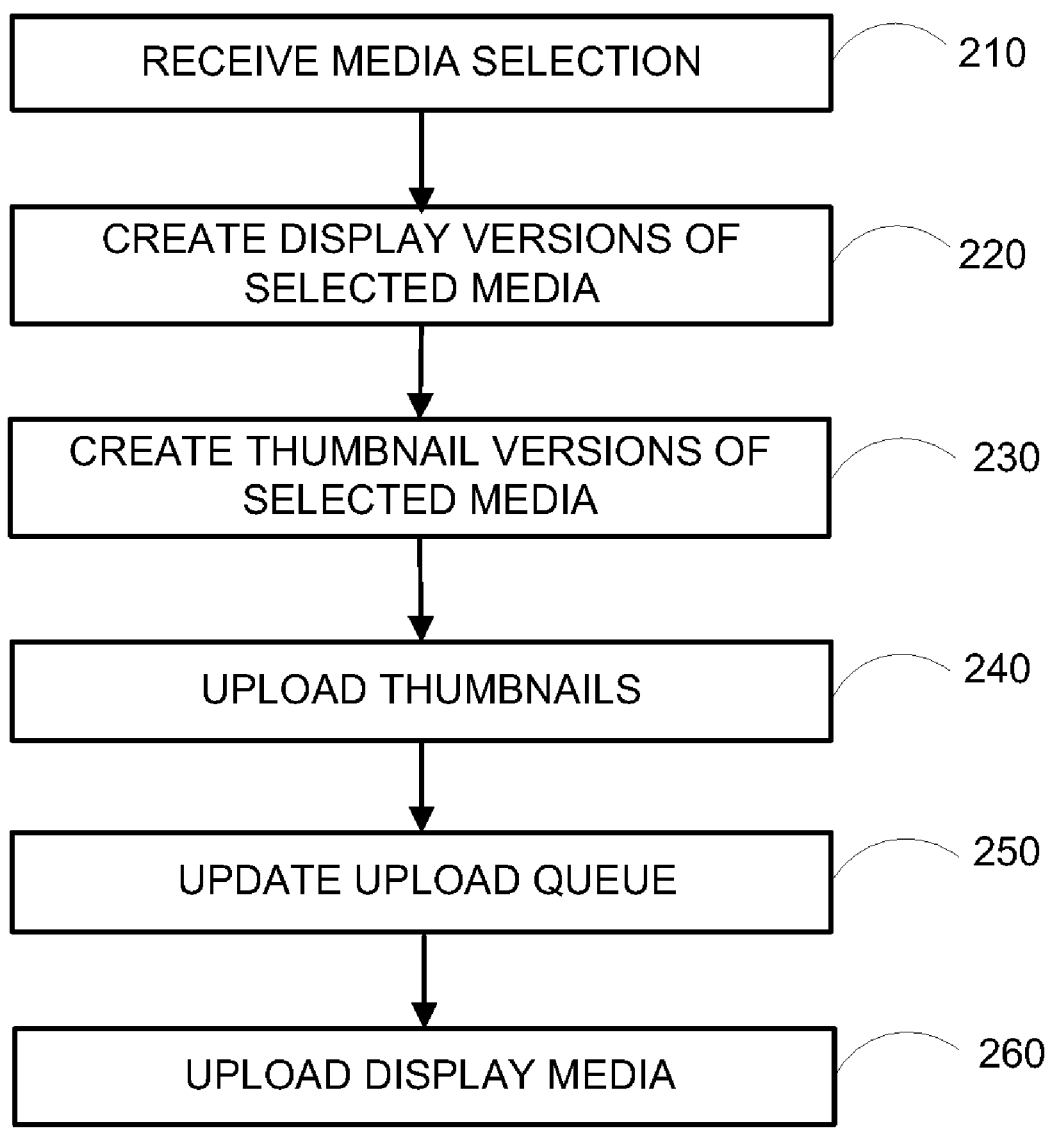
FIG. 2 illustrates a flow chart of a method for uploading original media during an IM session according to implementations described herein.

FIG. 2 illustrates a flow chart of a method 200 for uploading the original media 122 during an IM session according to implementations described herein. In one implementation, the method 200 may be performed by the photoshare application 116.

At step 210, the photoshare application 116 may receive a selection to upload the original media 122 that the host/guest is sharing. However, because the original media 122 may be in a format that is not conducive to ready transfer during the IM session, the original media 122 may be converted to a more suitable format before uploading to the destination.

As such, at step 220, the photoshare application 116 may create the display media 120 version of the original media 122 that is selected. During the upload of the display media 120, the photoshare application 116 may present the contents of the upload queue 124 by displaying the thumbnail media 118 associated with the display media 120 being uploaded. In one implementation, the sequence within which the display media 120 is uploaded may be presented by displaying the thumbnail media 118 in the same sequence as the associated display media 120 are uploaded. Accordingly, at step 230, the thumbnail media 118 associated with the selected original media 122 may be created.

At step 240, the photoshare application 116 may upload the thumbnail media 118 to the destination. In one implementation, the thumbnail media 118 may be uploaded in the same sequence that the respective display media 120 is uploaded.

At step 250, the photoshare application 116 may update the upload queue 124 on the source to reflect the sequence in which the display media 120 are uploaded to the destination. At step 260, the display media 120 may be uploaded to the destination in the sequence recorded in the upload queue 124.

Figure 3:
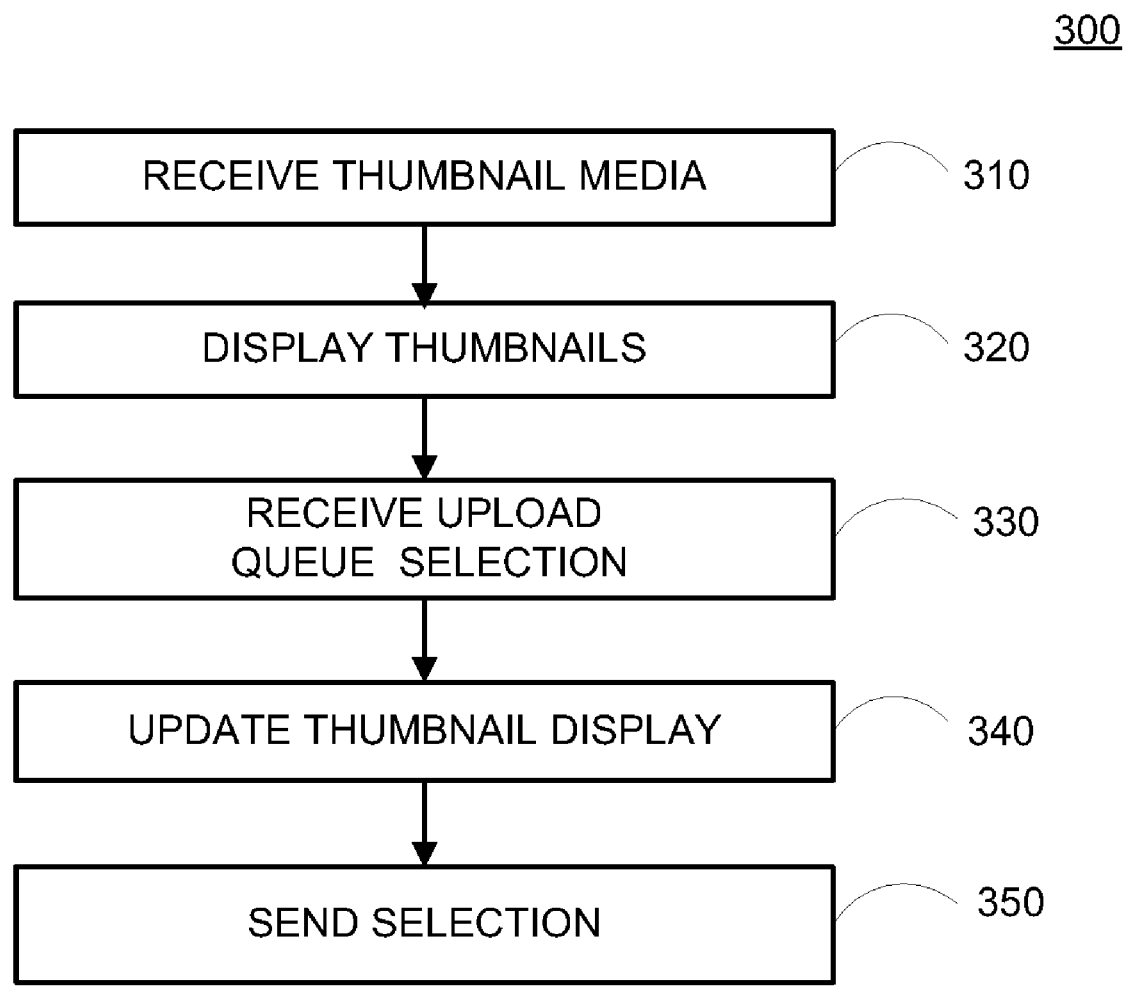
FIG. 3 illustrates a flow chart of a method for modifying the upload queue according to implementations described herein.

FIG. 3 illustrates a flow chart of a method 300 for modifying the upload queue 124 according to implementations described herein. The method 300 may be performed by the photoshare application 116.

As stated previously, the host or guest may upload the display media 120 to the destination. For the sake of clarity, the following implementations are described under a scenario where the host uploads the display media 120 to the guest's client computer 102. In other words, the host's client computer 102 is the source, and the guest's client computer 102 is the destination. It should be understood that the roles as described in the following implementations may be reversed when the guest uploads the display media 120 to the host's client computer 102.

At step 310, the guest's photoshare application 116 may receive the thumbnail media 118 from the source. At step 320, the photoshare application 116 may display the thumbnail media 118 on the output device 119 in the sequence in which the thumbnail media 118 are received.

In some cases, the guest may want to change the sequence in which the display media 120 are uploaded. For example, the guest may see an image of interest in one of the thumbnail media 118 that is at the end of the upload queue 124.

In one implementation, the guest may click on the thumbnail media 118 of interest. In response, the corresponding display media 120 may be moved to the top of the upload queue 124. In this manner, the corresponding display media 120 may be the next item uploaded to the destination. Accordingly, at step 330, the guest's photoshare application 116 may receive a selection of one of the thumbnail media 118.

At step 340, the guest's photoshare application 116 may send the selection to the source. In one implementation, the selection may indicate the display media 120 associated with the selected thumbnail media 118 to move to the top of the upload queue 124.

At step 350, the guest's photoshare application 116 may update the display of the thumbnail media 118 to reflect the new sequence of the display media 120 in the upload queue 124.

FIG. 4 illustrates an example user interface 400 in side-by-side screen shots for the host and guest according to implementations described herein. The user interface 400 may include a display region 410, a thumbnail region 420, and a chat region 430. The chat region 430 may be a user interface for exchanging text messages, icons, and other conversational-type content via the IM application 114.

The thumbnail region 420 may display the thumbnail media 118 that are uploaded to the destination. In this example, the thumbnail region 420 includes three thumbnail media 418, labeled, 'A,' 'B,' and 'C.' In one implementation, the thumbnail region 420 may include a scroll bar to accommodate viewing multiple thumbnail media 418.

Additionally, referring back to FIG. 2, during the upload of the display media 120, the corresponding thumbnail media 418 may be displayed in the fashion of a progress bar. In this fashion, a grayed-out portion of the thumbnail may indicate a proportion of the media that is uploaded. This grayed-out portion may show the progress of the upload. Once the upload of the display media 120 is complete, the thumbnail media 418 image may appear without additional effects.

The photoshare application 116 may display the display media 120 in the display region 410 based on a user selection in the thumbnail region 420. In other words, in response to the host or guest clicking on one of the thumbnail media 418, the photoshare application 116 may display the display media 120 that corresponds to the thumbnail media 418 selected. The same display media 120 may be displayed in both the host's and guest's display regions 410. The display region 410 is described in greater detail with reference to FIG. 5.

Although the guest and host can independently scroll through the thumbnail media 418 in their respective thumbnail regions 420, a selection by either user (as described above) may modify the thumbnail region 420 of the other. For example, in response to the host clicking on one of the thumbnail media 418, the same thumbnail media 418 displayed in the host's thumbnail region 420 may then be displayed in the guest's thumbnail region 420.

In some circumstances, the guest may want copies of the original media 122 that corresponds to the display media 120 uploaded to the destination. In one implementation, the photoshare application 116 may enable the guest to request a copy of the original media 122. For example, in response to a mouse-over action in the display region 410, the photoshare application 116 may display a context menu (not shown) that includes a download icon (not shown). The guest may click on the download icon to download a copy of the original media 122 that corresponds to the display media 120 in the display region 410.

In another implementation, the context menu may include a download album icon (not shown). In response to the guest's click on the download album icon, the photoshare application 116 may download the original media 122 that corresponds to all the display media 120 that the host uploads to the guest's client computer 102 during the current IM session.

The user interface 400 may also enable the host to remove the display media 120 that are uploaded to the guest's client computer 102. In one implementation, the photoshare application 116 may display a context menu that includes a delete icon (not shown) in response to the host's mouse-over action on one of the thumbnail media 418. In response to the host clicking on the delete icon, the photoshare application 116 may delete the thumbnail media 118 corresponding to the thumbnail media 418 mouse-over and the corresponding display media 120 from the guest's client computer 102.

Figure 5:
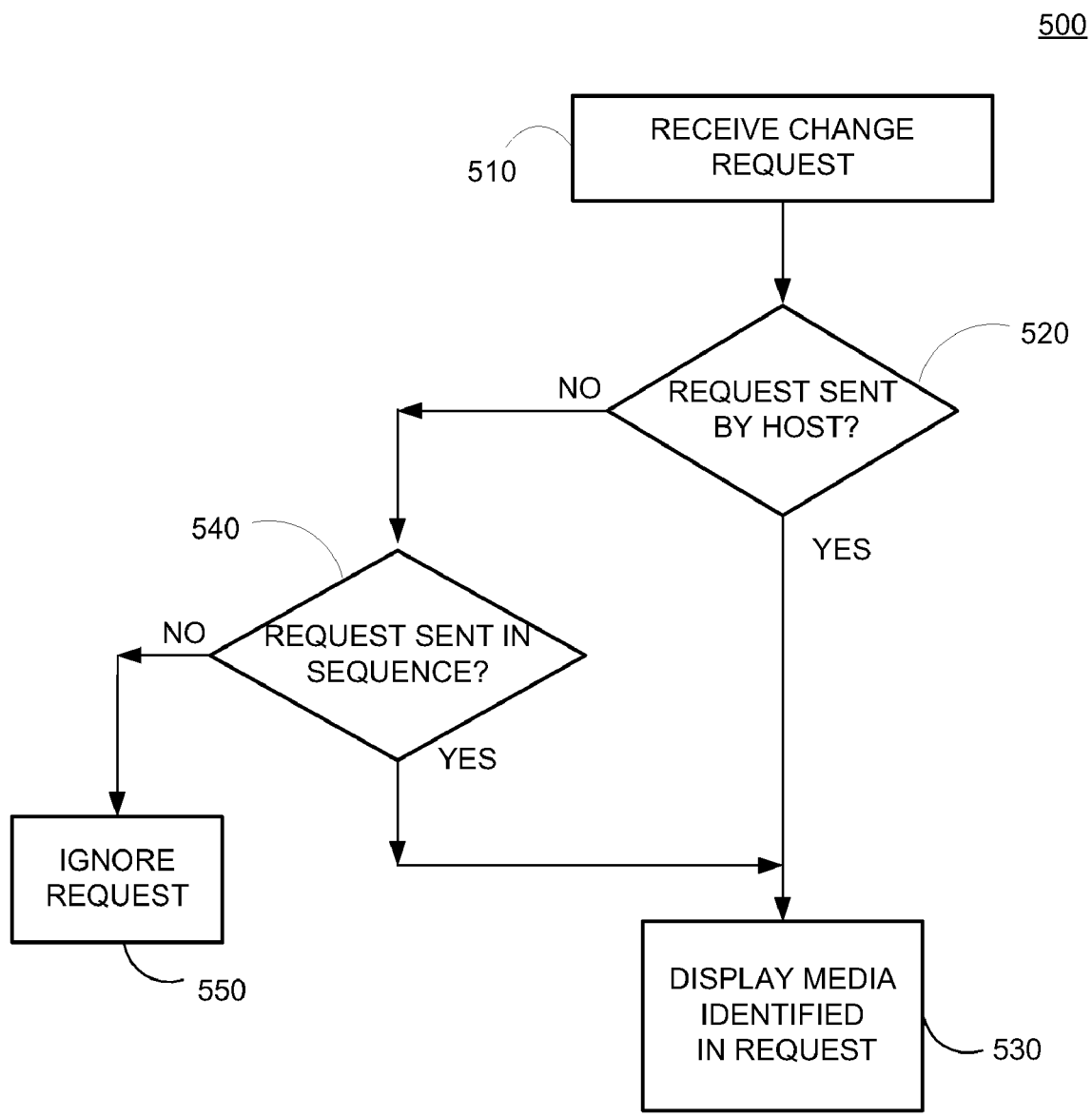
FIG. 5 illustrates a flow chart of a method for updating the display region in accordance with implementations described herein.

FIG. 5 illustrates a flow chart of a method 500 for updating the display region 420 in accordance with implementations described herein. The method 500 may be performed by the photoshare application 116.

At step 510, a change request may be received by the client computer 102. The change request may be a request to change the display media 120 in the display region 410. In one implementation, the change request may include sequence parameters that may indicate a conflict from simultaneous, or near-simultaneous, change requests from both the host and the guest.

The change request may be sent by the guest to the host, or by the host to the guest. To facilitate synchronous displays of the display media 120, one user's change requests may be prioritized over the other user's change requests in the event of simultaneous, or near-simultaneous, change requests. In one implementation, the prioritized user may be the host. For example, at step 520, if the change request is sent by the host, the method 500 proceeds to step 530. At step 530, the photoshare application 116 may display the display media 120 identified in the change request in the display region.

If the change request is not sent by the host, the method 500 proceeds to step 540. At step 540, if the request sent by the guest is sent in sequence, the method 500 proceeds to step 530. In the event that the guest sends the change request nearly simultaneously with the host sending a second change request, the guest's request may be out of sequence. If the guest's change request is sent out of sequence, i.e., before the guest receives the host's near-simultaneous change request, the method 500 proceeds to step 550. At step 550, the change request may be ignored.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for uploading a set of media from a source to a destination, comprising:
   during an instant messaging (IM) session in which the source and the destination are participating, displaying an upload queue on a display associated with the source and a display associated with the destination, the upload queue comprising thumbnail media created from the set of media, the upload queue representing the set of media to be uploaded according to a first sequence;
   receiving a selection of one of the media to be placed at a top of the upload queue;
   sending the selection to the source that is uploading the media;
   modifying the upload queue such that the source uploads the set of media according to a second sequence where the one of the media is at a top of the upload queue; and
   simultaneously receiving from the source and the destination a selection of another one of the media to be placed at the top of the upload queue;
   determining whether the selection of the destination is in sequence;
   ignoring the selection of the destination, if the selection of the destination is not in sequence; and
   modifying the upload queue such that the source uploads the set of media according to a third sequence where the another one of the media selected by the destination is at a top of the upload queue, if the selection of the destination is in sequence; and
   displaying the modified upload queue according to the second sequence on both the display associated with the source and the display associated with the destination.

2. The method of claim 1, further comprising receiving the set of media according to the second sequence.

3. The method of claim 1, wherein a proportion of one of the media that has been uploaded is indicated by a grayed-out proportion of a reduced size version of the one of the media.

4. The method of claim 1, wherein the set of media comprises a set of images.

5. The method of claim 1, wherein the source and the destination are connected over a peer-to-peer connection.

6. The method of claim 1, further comprising in response to receiving a selection of one of the set of media, simultaneously displaying the selected one of the set of media on both the display associated with the source and the display associated with the destination.

7. The method of claim 1, wherein the upload queue comprises a reduced size version of the set of media.

8. The method of claim 7, further comprising displaying the reduced size version of the media as a progress bar.

9. The method of claim 8, wherein a proportion of one of the media that has been uploaded is indicated by a grayed-out proportion of the reduced size version of the one of the media.

10. A user interface for modifying an upload queue, comprising:
    a thumbnail region of the user interface that displays the upload queue comprising thumbnail media created from a set of media, the upload queue representing the set of media to be uploaded according to a first sequence from a source; and
    a display region that displays a selected one of the set of media, wherein in response to receiving a selection of one of the media to be placed at a top of the upload queue, sending the selection to the source; simultaneously receiving from the source and the destination a selection of another one of the media to be placed at the top of the upload queue; determining whether the selection of the destination is in sequence; ignoring the selection of the destination, if the selection of the destination is not in sequence; modifying the upload queue such that the source uploads the set of media according to a third sequence where the another one of the media selected by the destination is at a top of the upload queue, if the selection of the destination is in sequence, and modifying the thumbnail region of the user interface to display the upload queue according to a second sequence where the one of the media is at a top of the upload queue.

11. The user interface of claim 10, wherein the set of media comprises a set of images.

12. The user interface of claim 10, wherein the upload queue comprises a reduced size version of the set of media.

13. The user interface of claim 10, further comprising displaying a reduced size version of the media as a progress bar.

14. The user interface of claim 13, wherein a proportion of one of the media that has been uploaded is indicated by a grayed-out proportion of the reduced size version of the one of the media.

15. A computer system for uploading a set of images, comprising:
- a destination computer, comprising:
- a first processor; and
- a first memory comprising program instructions executable by the first processor to:
- during an instant messaging (IM) session in which a source and the destination are participating, display an upload queue comprising reduced size versions of the set of images created from the set of images, the upload queue representing the set of images to be uploaded according to a first sequence;
- receive a selection of one of the images to be placed at a top of the upload queue;
- send the selection to the source computer that is uploading the set of images;
- display the upload queue according to a second sequence where the one of the images is at a top of the upload queue;
- simultaneously receive from the source and the destination a selection of another one of the media to be placed at the top of the upload queue;
- determine whether the selection of the destination is in sequence;
- ignore the selection of the destination, if the selection of the destination is not in sequence;
- modify the upload queue such that the source uploads the set of media according to a third sequence where the another one of the media selected by the destination is at a top of the upload queue, if the selection of the destination is in sequence; and
- receive the set of images according to the upload queue second sequence.

16. The computer system of claim 15, wherein the source computer comprises a second processor; and
- a second memory comprising program instructions executable by the second processor to:
- display the upload queue;
- receive the selection from the destination computer;
- modify the upload queue in response to receiving the selection according to the second sequence;
- upload the set of images according to the second sequence; and
- display the uploaded queue according to the second sequence.

17. The computer system of claim 15, wherein the source computer and the destination computer are participating in the instant messaging session over a peer-to-peer connection.

18. The computer system of claim 15, wherein the first memory further comprises program instructions executable by the first processor to display the reduced size version of the images as a progress bar.

19. The computer system of claim 18, wherein a proportion of one of the images that has been uploaded is indicated by a grayed-out proportion of the reduced sized version of the one of the images.

* * * * *